United States Patent
Uno et al.

[15] 3,680,457
[45] Aug. 1, 1972

[54] CAMERA HAVING A PRELIMINARY FLASH ILLUMINATION FOR EXPOSURE DETERMINATION

[72] Inventors: Naoyuki Uno, Oi-Machi; Seijiro Tokutomi, Fujisawa, both of Japan

[73] Assignee: Asahi Kogaku Kogyo Kabushiki Kaisha, Tokyo-to, Japan

[22] Filed: June 1, 1970

[21] Appl. No.: 42,387

[30] Foreign Application Priority Data

June 6, 1969 Japan..........................44/44811

[52] U.S. Cl.......................................95/42, 95/10 C
[51] Int. Cl..............................................G03b 19/12
[58] Field of Search................................95/10 C, 42

[56] References Cited

UNITED STATES PATENTS 3,324,779  6/1967  Nobusawa et al................95/42
3,173,347  3/1965  Stimson et al..................95/10 C
3,418,904  12/1968  Wick et al.....................95/10 C

*Primary Examiner*—Samuel S. Matthews
*Assistant Examiner*—Richard A. Wintercorn
*Attorney*—Steinberg & Blake

[57] ABSTRACT

A camera for controlling exposure in accordance with the light intensity of a preliminary flash. This light from the preliminary flash first passes through the objective of the camera and then is received by a light-detecting unit for measuring the light intensity. Information measured by the latter unit is used for controlling the exposure, so that the latter control is achieved with light which has already passed through the camera objective.

10 Claims, 3 Drawing Figures

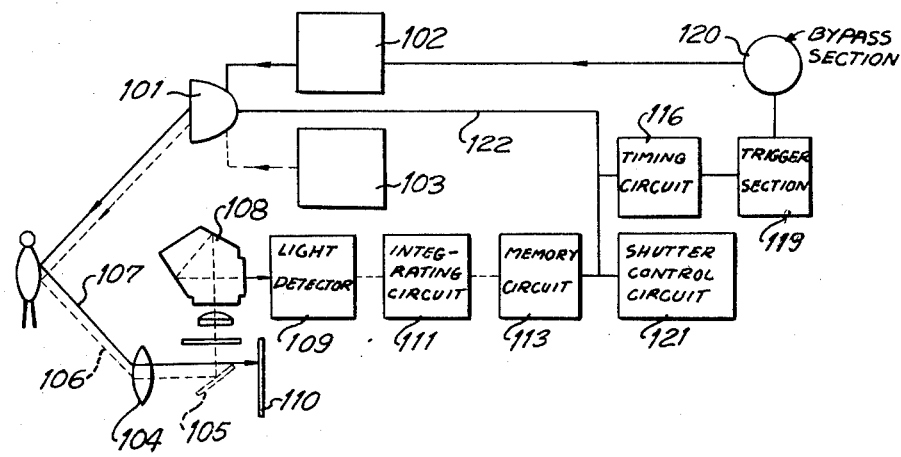
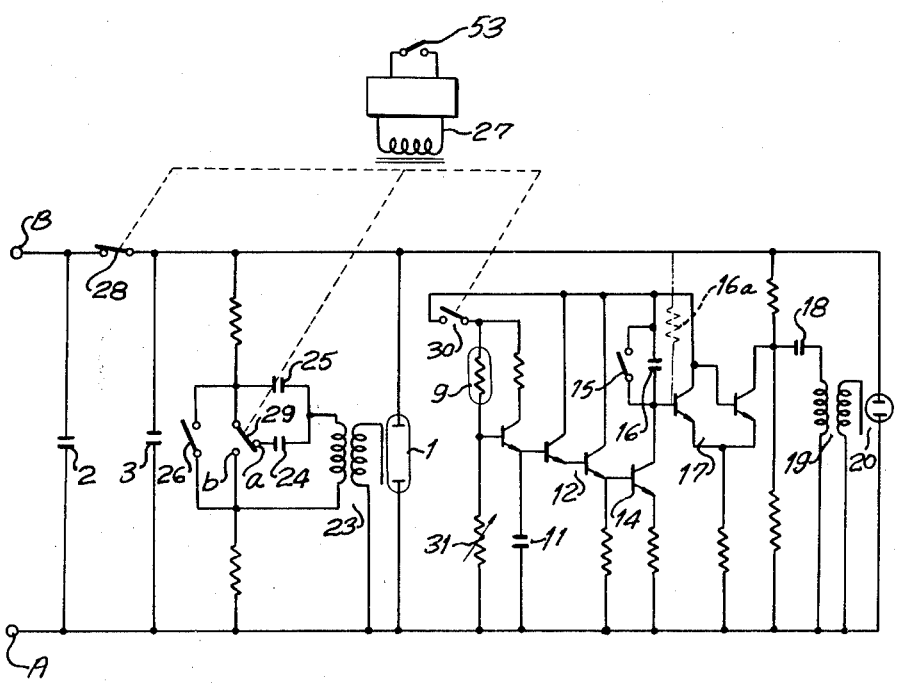

CAMERA HAVING A PRELIMINARY FLASH ILLUMINATION FOR EXPOSURE DETERMINATION

BACKGROUND OF THE INVENTION

The present invention relates to cameras.

In particular, the present invention relates to cameras which make exposures with flash illumination, and especially to cameras of this type which can have the extent of exposure automatically determined.

The flash illumination is derived from a flashbulb or a strobe which takes the form of a xenon discharge tube. In order to determine exposure, there is a preliminary flash, the light intensity of which is measured, and in accordance with the light intensity which may be measured by a light-responsive element an electrical signal integration and memory system for the electrical signal, corresponding to detected object brightness are provided together with a signal output system for the memorized information of the memory system so as to control the exposure either by interrupting the flash illumination after a given interval or by controlling the shutter in an appropriate manner.

With conventional arrangements of this general type, in order to determine automatic control of the exposure when utilizing flash illumination, a xenon discharge tube is used for the flash device and the object is illuminated by a flash produced in synchronism with operation of the shutter. The light which is reflected from the illuminated object reaches the light-receiving component conventionally situated at the housing of the camera or in the immediate vicinity thereof. This reflected light is then converted into a corresponding electrical signal used to charge a capacitor of the integrating circuit so as to achieve in this way an increase in the voltage across the terminals of the capacitor. When this rising voltage across the terminals of the capacitor reaches a given value, which will correspond to a proper exposure for the given photographing conditions, which includes factors such as film speed and the size of the exposure aperture determined by the diaphragm setting, a light-terminating signal is produced from the appropriate section of the circuit which recognizes that the extent of exposure has reached the appropriate value, and this light-stopping signal triggers a bypass discharge tube connected electrically in parallel with the discharge tube which provides the flash illumination. This bypass discharge tube is constructed in such a way that at the moment of discharge it has an internal resistance value corresponding to about one-tenth the internal resistance value of the discharge device providing the flash illumination. Therefore the bypass discharge causes the greater part of the light producing energy in the primary discharge capacitor to be consumed by the bypass discharge tube, thus terminating the light emission from the flash source.

Although arrangements of the above conventional type have been used in practice as an effective structure for automatic exposure control with substantially instantaneous flash illumination, there is a serious drawback in that the light-receiving component is not constructed in such a way as to render it capable of receiving light which has already passed through the camera objective. With the conventional constructions it is only possible to provide a light receiver which receives light at the exterior of the camera or in the vicinity thereof. As a result, the angle at which the light of the preliminary flash is received, the light at the camera housing, etc., the time of the light measurement, are of a predetermined fixed value so that there is a considerable reduction in the accuracy and efficiency of the operation, particularly in the case where interchangeable objectives with different viewing angles are utilized.

If indeed the light-receiving component is arranged so as to receive light which has already passed through the objective of the camera, it can be used for automatic exposure control in a single lens reflex camera utilizing interchangeable objectives as well as in other cameras.

It is possible to arrange the light-receiving component internally within a camera to receive light in different ways. According to one procedure, a semitransparent reflector is situated obliquely across the path of light which was already passed through the objective of a single lens reflex camera. This oblique semitransparent reflector divides the light into reflected light which is reflected by the reflector and transmitted light which passes through the reflector. One of these light portions is directed to the film so as to make the exposure while the other is directed to the light-receiving unit which measures the light intensity so as to determine the extent of the exposure.

Another method is to utilize light which has already reached the surface of the film. Thus, light from the object which has already passed through the objective is directed to the film surface, and light which is reflected from the film surface is directed to the light-receiving component which measures the light intensity.

The first of these methods is undesirable and does not provide a satisfactory solution to the problem because the light which has passed through the objective cannot be effectively utilized in a single lens reflex camera inasmuch as the image seen in the viewfinder would have a diminished amount of brightness and the quality of the image would be very poor. Thus, because of these factors it is entirely impractical to provide the first of the above arrangements. The second method using light reflected from the film is not practical because the index of reflection from the film surface varies with the type of film which is used. Compensation of such a reflective index variation is difficult to carry out due to the difficulties encountered in recognizing the different types of film.

SUMMARY OF THE INVENTION

It is accordingly a primary object of the present invention to provide a satisfactory solution to the above problem.

In particular, it is an object of the invention to provide for automatic determination of exposure with flash illumination by first measuring the light of a preliminary flash while measuring the latter light only after it has passed through the objective, without however making use of semitransparent reflectors which divide the light or making use of light reflected from the surface of the film itself.

In particular, it is an object of the invention to provide exposure determination with measurement of light from a preliminary flash, after the light has passed through the camera objective, in a manner which is particularly suitable for single lens reflex cameras so that the features of the invention are especially suited for use with cameras which have interchangeable objectives.

It is also an object of the invention to provide an automatic exposure determination of the above type, capable of bringing about termination of exposure either by termination of the flash illumination or by closing of the shutter.

Furthermore, it is an object of the invention to provide a construction of this type where the sequence of operations follows from the manual actuation of a shutter-operating element, without relying on factors such as the inertia of movable components to bring about a desired sequence of operations.

Also, it is an object of the invention to provide a construction which can operate either with a common, single source of flash illumination, both for the preliminary and the primary flash, or with a pair of independent sources of flash illumination, one for the preliminary flash and the other for the primary flash.

According to the invention the camera has an objective and a flash means for providing flash illumination. A light-directing means is provided for directing light which has passed through the objective along a predetermined path. A detecting means is situated along the latter path for receiving light which travels therealong so as to detect the light and measure the intensity thereof to provide a memorized signal which can be used by a control means for determining the extent of exposure. A preliminary actuating means and a primary actuating means are both connected operatively with the flash means for respectively providing preliminary and primary flash illumination. The detecting means receives the light resulting from the preliminary flash illumination for providing a control signal which is temporarily memorized to be transmitted to the control means, and when the primary actuating means operates to provide the primary flash the signal which is memorized is used by the control means to determine the proper extent of exposure.

BRIEF DESCRIPTION OF DRAWINGS

The invention is illustrated by way of example in the accompanying drawings which form part of this application and in which:

FIG. 1 is a schematic representation of the operating components, including a block diagram and a diagrammatic representation of the manner in which light is emitted and received to be measured;

FIG. 2 is a wiring diagram of the components of the circuit of the invention.

DESCRIPTION OF PREFERRED EMBODIMENTS

Figure 3:
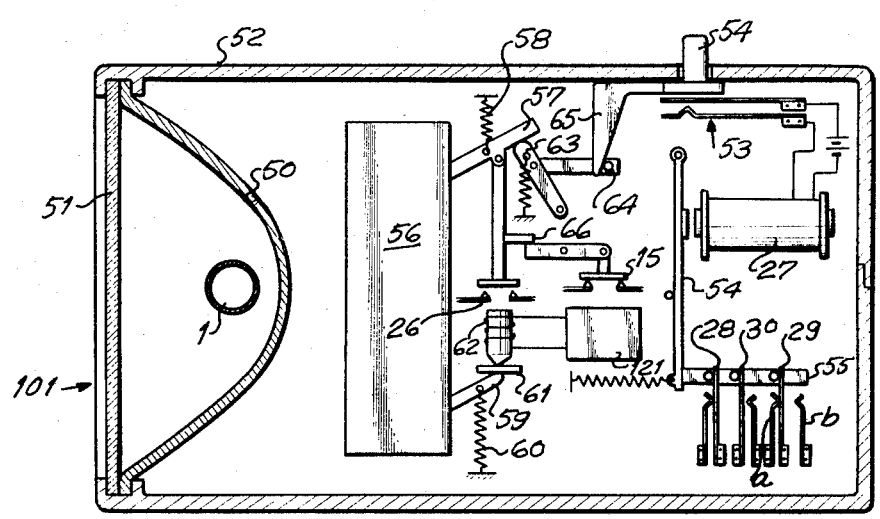
FIG. 3 is an additional schematic representation of various control elements, FIG. 3 schematically illustrating the manner in which the sequence of control operations are carried out in response to manuel shutter actuation.

According to the invention the light of the preliminary flash is directed through the viewfinder so that in this way it becomes possible to measure this light internally. As a result, it is unnecessary to resort to procedures such as reflecting light from the film surface or dividing the light with part transmitted through and part reflected by a semitransparent reflector.

Referring now to the drawings, FIGS. 1 and 3 illustrate a suitable light source 101 which may be a strobe in the form of a xenon discharge tube 1 situated in front of a reflector 50 and behind a window 51, as schematically illustrated in FIG. 3 where the flash means 101 is shown mounted on a housing 52, which may form part of the camera.

This flash means 101 is provided with a pair of actuating means, namely a primary flash current source 102 for providing the primary flash and forming the primary actuating means and a preliminary flash current source 103 forming the preliminary actuating means for the flash means 101. These current sources 102 and 103, which form the preliminary and primary actuating means for the flash means 101, utilize also the capacitor 2 for the primary actuating means and the capacitor 3 for the preliminary actuator means, these capacitors being indicated in FIG. 2.

FIG. 1 schematically illustrates an objective 104 of a single lens reflex camera. Behind the objective is located a tiltable reflector 105, and this reflector normally extends in the dotted line position of FIG. 1 obliquely across the optical axis. The actuation of the flash means 101 by the preliminary actuating means 103, which includes the capacitor 3, provides the light 106 resulting from the preliminary flash, and this light 106, shown by the dotted line in FIG. 1, passes through the objective 104 and is reflected by the tiltable reflector 105 into the prism 108 of the viewfinder. Thus, the reflector 105 and prism 108 form a light-directing means for directing light which has already passed through the objective 104 along a predetermined path. Situated along this path to receive the light is a detecting means 109 which receives the light and which includes, for example, a photosensitive conductor 9 situated so as to receive light issuing from the pentaprism 108 of the viewfinder.

When the shutter is released for operation to make an exposure, the mirror or reflector 105 is swung in a well known manner out beyond the path of light so that now the light 107 from the object which is to be photographed will reach the film 110 in order to provide the exposure. This light 107 is indicated with a solid line and is the primary flash illumination achieved from the flash means 101 in response to actuation by the primary actuating means 102 which includes the capacitor 2.

The detecting means 109 detects the brightness or intensity of the reflected light 106 from the object, and a current which corresponds to this brightness charges a capacitor 11 so that the voltage across the terminals of the capacitor forms an information signal which corresponds to the amount of light 106 which is reflected from the object. The detecting means 109 includes an integrating circuit 111 operatively connected with the light-receiving component of the detecting means 109. This integrating circuit 111 is operatively connected with a memory circuit 113 which also forms part of the detecting means, and it is this memory circuit 113 which contains the capacitor 11 as well as a high input impedance transistor circuit 12 the control signal of which is formed by the voltage across the terminals of the capacitor 11.

The signal which is thus memorized by the detecting means and which has a value corresponding to the intensity of the light 106 of the preliminary flash, is transmitted to a control means which, in accordance with this latter signal, will determine the extent of exposure. This control means which receives the information from the memory circuit 11 takes this information in the form of an emitter voltage signal of the transistor circuit 12, and this latter signal is delivered to the base of the next stage current control transistor 14 which forms part of the control means. The collector of the transistor 14 is connected in series with a timing capacitor 16 of the control means. This capacitor is normally bypassed by a normally closed switch 15 which is connected in parallel with the timing capacitor 16. This switch 15 is arranged, as described below in connection with FIG. 3, so that it will be opened simultaneously with the shutter opening operation of the camera. Thus, the control means includes a timing circuit 116 (FIG. 1) which is regulated by the current control of the transistor 14. The control means includes a trigger section 119 connected to the timing circuit 116 and containing a switching transistor 17, a trigger capacitor 18 and a trigger transformer 19. When the voltage across the terminals of capacitor 16 reaches a given value, the switching transistor 17 is rendered conductive as a result of the voltage applied to the control electrode thereof. The trigger capacitor 18 and the trigger transformer 19 are connected in series in the current control circuit of the switching transistor 17. A bypass discharge means is formed by the bypass section 120 which includes the discharge tube 20 controlled by the trigger section 119. The bypass section 120 is connected in parallel with the flash discharge tube 1 with respect to the capacitors 2 and 3.

The control means also includes the shutter control circuit 121 which in a known way is provided with a timing circuit, a switching circuit, and an electromagnetic device for initiating shutter closure. The arrangement may be made in such a way that the information from the memory circuit 113 of the detecting means is given either to the timing circuit 116 so that the control means will bring about discharge through the bypass discharge means 20 at the proper moment for terminating in this way the discharge from the tube 1, or the signal from the detecting means may be selectively delivered to the shutter control circuit 121 to bring about termination of exposure simply by closing of the shutter at the proper moment. Also, it is possible to provide an arrangement where the information of the memory circuit 113 is delivered from the detecting means to both the timing circuit 116 and the shutter control circuit 121.

FIG. 1 also illustrates a signal transmitting circuit 122 for synochronizing the initiation of the timing action of the timing circuit 116 and the emission of light from the flash means 101.

Referring to FIG. 2, there are illustrated the high voltage source terminal B and the low voltage terminal source A, the high voltage source being used for the primary flash while the low voltage source is used for the transistor operation circuit. A trigger transformer 23 is provided to bring about energizing of the xenon discharge tube 1. The current sources for the trigger transformer 23 are formed by a primary flash trigger capacitor 24 and a preliminary flash trigger capacitor 25 which are charged though a bleeder current due to a bleeder circuit connected in parallel with the capacitors 2 and 3 for flash operation. A synchronizing switch 26 is provided to close the circuit connecting the trigger capacitor 24, 25 in series with the primary winding of the trigger transformer 23, and this synchronzing switch 26 is arranged so as to be closed simultaneously with opening of the shutter.

An electromagnetic relay 27 is provided as shown at the upper portion of FIG. 2, and this relay has a responsive switch 28 which is situated between the primary flash capacitor 2 and the preliminary flash capacitor 3, the latter capacitors being connected in parallel. A further responsive switch 29 of the electromagnetic relay 27 is arranged so as to bring about a change-over operation between the bleeder circuit terminal a of the primary flash trigger capacitor 24 and the trigger switch terminal b of the preliminary flash trigger capacitor 25. A further responsive switch 30 of the relay 27 is arranged so as to connect the light-receiving section 109 of the detector means to the low voltage source A.

Referring to FIG. 3, it will be seen that the relay 27 is schematically represented as being energized upon closing of a switch 53. The switch 53 is closed upon manual actuation of a shutter operating element 54 accessible to the operator. The operator will depress the element 54 so as to close the switch 53, thus energizing the electromagnetic relay 27. The result is that the armature 54 of the relay is pulled to the right, thus shifting a switch control 55 to the right, as viewed in FIG. 3, bringing about the opening of the switch 28, the closing of the switch 30, and the change-over of element 29 from contact a to contact b. It will be noted that the space between element 29 and contact b is greater than the space between the contacts of the switch 30, so that when the electromagnetic relay 27 is energized by manual actuation of the element 54 the switch 30 will close before the change-over element 29 engages the contact b.

FIG. 3 also schematically illustrates the control mechanism 56 for a focal plane shutter. This shutter is shown in its cocked position in FIG. 3. A lever 57 is acted upon by a spring 58 so as to be urged downwardly, as viewed in FIG. 3, and this lever 57 when swung downwardly by the spring 58 will release the leading curtain of the focal plane shutter for movement from its cocked to its shutter-opening position. The mechanism 56 also includes a lever 59 which is urged to swing downwardly by the spring 60. When the lever 59 is swung downwardly by the spring 60 it brings about the release of the trailing curtain of the focal plane shutter so that the trailing curtain will now run from its cocked to its shutter-closing position. The lever 59 is diagrammatically illustrated as being maintained in the cocked position by the armature 61 of an electromagnetic 62 which is energized by the shutter control circuit 121 when exposure takes place. Thus, in order to terminate the exposure, the circuit 121 will automatically terminate the energizing of the electromagnet 62, thus releasing the armature 61 for movement away from the core of the electromagnet, and at this instant the spring 60 will pull the lever 59 to a position releasing the trailing curtain for movement to the shutter-closing position.

The lever 57 is maintained in the shutter-cocked position by a swing lever 63 urged to the position illustrated in FIG. 3 by a spring. This lever 63 has an extension carrying a pin 64 to be acted upon by a cam 65 which is fixed to the element 54.

The arrangement is such that when 54 is depressed, during the first part of the shutter control operation the switch 53 closes to energize the relay 27 and bring about the operation of the switches 28-30 as indicated above. After the first part of the movement of element 54 has been carried out, so that the preliminary flash has had the intensity thereof detected and measured to provide the memorized signal to be transmitted to the control means, the cam 65 coacts with the pin 64 to displace the lever 63 to a position releasing the lever 57 to the action of the spring 58 so as to release the leading curtain for movement from the cocked to the shutter-opening position. Simultaneously with the movement of the lever 57, a cam 66 opens the switch 15 and the switch 26 will automatically close, as indicated schematically in FIG. 3.

As may be seen from FIG. 2 a variable resistor 31 is connected in series with a photosensitive conductor 9 which receives the light and forms the light-receiving component of the detector 109. The setting of the variable resistor 31 can be selected according to the speed of the film which is exposed or according to the aperture setting provided with the diaphragm. Several resistors are utilized in the circuit of FIG. 2 in order to provide a stabilized operation for the circuit.

The operation of the above structure is as follows:

Prior to actual exposure, a preparatory or preliminary illumination is carried out by utilizing the preliminary actuating means 103 in order to energize the flash means 101. The reflected light 106 travels from the object through the objective 104 and is directed by the reflector 105 of the light-directing means to the viewfinder which also forms part of the light-directing means. In this way the light is directed along the path to be received by the light detector 109 of the detecting means. This detector provides the signal for the intergrating circuit which in turn transmits the information with respect to the amount of light of the reflected light 106 sensed by the component 9 to the memory circuit 113 to form the item of memorized information to be used by the control means. After the information memorizing operation with respect to the preliminary illumination has been carried out, an actual exposure is made. As is well known, the actuation of the shutter-tripping element 54 will bring about in a known way swinging of the reflector 105 up to the position shown in solid lines in FIG. 1, and simultaneously the shutter opening operation is brought about and the shutter is fully opened. Simultaneously with the opening of the shutter the switch 26 is closed so as to bring about the synchronized energizing of the flash means 101 by the primary actuating means 102. At this time the timing circuit 116 of the control means receives the memorized signal from the memory circuit 113 and begins the operation so that after lapse of a predetermined time interval in accordance with the signal transmitted from the memory circuit 113, the trigger section 119 brings about actuation of the short circuit element which becomes conductive. Accordingly, the remaining energy of the source 102 is instantaneously discharged through the bypass discharge means 20 and light emission at the flash means 101 is terminated.

Thus, it is possible to control the primary flash illumination on the basis of the memorized object brightness signal resulting from the preliminary flash illumination. For proper exposure, however, a certain compensation must be made with respect to the memorized signal. In this connection, the following factors are set forth:

Let the proper exposure amount for a film of a certain sensitivity value be Ec, the exposure time at the synchronized photographing operation be T and the film surface illumination at that time be Io, than $$Ec = IoT \qquad 1$$

If the film surface illumination with respect to an object under natural light is $i$, and the exposure amount due to emitted light is $E_f(t)$, then $$Ec = E_f(t) + iT \qquad 2$$

From the Equations 1 and 2, $$E_f(t) = T(Io - i) \qquad 3$$

Let the entire light bundle of the emitted light be $L(t)$ and the object brightness $B(t)$, then $$B(t) = (h \cdot L(t)/a^2 \qquad 4$$

where $a$ is the distance between the light source and the object and $h$ is a constant determined through the reflective index of the reflector of the light source and of the object. In connection with this, the film surface illumination $I(t)$ is:

$$I(t) = \alpha B(t)/A^2 = \alpha \, h/a^2 A^2 \, L(t) \qquad 5$$

where A is the diaphragm value and $\alpha$ is a constant determined through light transmission or reflection with respect to the lens. Accordingly, the film surface exposure amount $E_f(t)$ due to the emitted light is:

$$E_t(t) = \int_0^t \frac{\alpha \cdot h}{a^2 A^2} L(t)\,dt = \frac{\alpha \cdot h}{a^2 A^2} \int_0^t L(t)\,dt = \frac{\alpha \cdot h}{a^2 A^2} g(t) \qquad 6$$

wherein $$\int_0^t L(t)\,dt = g(t)$$

In the case of externally light measuring type automatic light emission adjustment arrangement, $L(t)$ is integrated by the integrating circuit and the light emission may be stopped at the time $t$ which is determined due to the relations (3) and (6)

If the time duration of the light emission is $t_o$, than $$\int_{t_0}^t L(t)\,dt = 0 \text{ so that } \int_0^t L(t)\,dt \leqq g(t_0) = Lm \qquad 7$$

therefore $$E_t(t) \leqq \frac{\alpha \cdot h}{a^2 A^2} Lm \qquad 8$$

wherein $Lm$ is the total amount of the emitted light. In a preparatory light emission where all the optical conditions except the light intensity are the same as those of the light emission for photographing operation, if the entire light bundle is $1(t)$ and the object brightness $b(t)$, then in the same manner as the Equation 4:

$$b(t) = h \cdot 1(t)/a^2 \qquad 9$$

With respect to this, the internally light measuring type light receiving surface illumination j(t) is:

$$j(t) = \beta\, b(t)/A^2 = (\beta \cdot h/a^2 A^2)\, 1(t) \qquad 10$$

wherein $\beta$ is a constant determined in accordance with the light receiving optical system. If the light receiving surface exposure amount is $Ep(t)$, then $$Ep(t) = \frac{\beta \cdot h}{a^2 A^2} \int_0^t 1(t)\, dt$$

wherein the total amount of the preparatory light emission in 1m, then $$Ep = (\beta \cdot h/a^2 A^2)\, 1m \qquad 12$$

wherein $Ep$ is the light receiving surface exposure amount due to the total light emission amount. The relation between the film surface exposure amount $E_f(t)$ due to the main light emission and the light receiving surface exposure amount $Ep$ due to the preparatory light emission is as follows:
Equation 6 / Equation 12 :

$$E_f(t)/Ep = \alpha \cdot h\, g(t)/\beta \cdot h\, 1m = \alpha\, g(t)/\beta\, 1m \qquad 13$$

Therefore, $$E_f(t) = (\alpha/\beta\, 1m)\, g(t) \cdot Ep \qquad 14$$

Applying the relation 14 to the relation 3.

$$(\alpha/\beta\, 1m)\, g(t)\, Ep = T(Io - i) \qquad 15$$

Therefore $$g(t) = (\beta\, 1mT/\alpha)\, (Io - i)/Ep = k(Io - i)/Ep$$

wherein $k = \beta\, 1mT/\alpha = $ const.
From the relation 15, a proper exposure can be carried out by first obtaining the natural light film surface illumination $i$ and the light receiving surface exposure amount $Ep$ due to the preparatory light emission through measurement at the light receiving surface and then stopping the synchronized light emission at the time $t$ which is determined in accordance with the obtained values.

Thus, emission of an amount of light during flash illumination which is required for proper exposure can be achieved by applying a compensating factor of the synchronized primary flash operation resulting from the primary flash emission to the memorized information signal resulting from the preparatory flash illumination, or by controlling the primary flash operating time with the time $t$ obtained by applying this compensating factor to the memorized signal itself.

The operation of the structure as shown in FIG. 2 is as follows:

After the primary capacitor 2 and the preliminary capacitor 3 are charged, the current supply switch 53 of the relay 27 is closed by the first portion of the movement of element 54, as described above. In this way the switches 28–30 are actuated as described above.

With the primary actuating means capacitor 2 disconnected from the circuit by the opening of the switch 28, a series circuit is formed with the preliminary flash trigger capacitor 25 and the trigger transformer 23 so that due to the application of a trigger voltage by the transformer 23 the Xenon discharge tube 1 will emit light with the preliminary flash capacitor 3 serving as a voltage source. At this time the light-receiving element 9 of the light detector 109 is functioning because of the closure of the switch 30, so that a current corresponding to the intensity of the light reflected from the object, resulting from the preliminary flash, as well as from any ambient natural light, begins to charge the capacitor 11. As time elapses, the amount of reflected light accumulated under these conditions increases with corresponding increase in the voltage across the terminals of the capacitor 11. This preliminary flash operation is completed after 1-2 milliseconds. When the supply of current to the relay 27 is terminated after an interval which is longer than the interval during which the preliminary flash provides illumination, for example after an interval of 5-6 milliseconds from the commencement of light emission, the last portion of the downward movement of the button 54 will bring about deenergizing of the relay 27. It will be noted from FIG. 3 that the switch 53 will actually be maintained closed, but the circuit includes an unillustrated timer which terminates the energizing of the relay 27 after the latter interval of, for example, 5-6 milliseconds. If desired, the element 54 can of course be constructed in such a way as to bring about opening of the switch 53 during the last portion of the movement of the element 54. Thus, the switches 28–30 are returned to the solid line positions of FIG. 2 when the shutter is opened to make an exposure.

At this time, which is to say after the preliminary flash illumination has been measured, the capacitor 11 has memorized, by way of the voltage across the terminals thereof, the intensity of the light reflected from the object during the time when the switch 30 remained closed. In other words $i$ and $Ep$ of Equation 15 have been measured and memorized.

When the depression of element 54 has reached its end, the shutter opens fully and the flash synchronizing switch 26 is closed simultaneously with the opening of the shutter. The trigger action of the trigger transformer 23 resulting from the discharge of the primary trigger capacitor 24 causes the tube 1 to emit the primary flash with the capacitor 2 serving as the voltage source at this time. At the same time, the switch 15 has been opened, as described above, so that under the amplifying action of the high input impedance transistor circuit 12 with the voltage across the terminals of the capacitor 11 serving as the biassing voltage thereof, the internal resistance between the collector and the emitter of transistor 14 is determined. Thus a current under the control of the transistor 14 now starts to charge the timing capacitor 16 of the control means.

After a time interval determined by the internal resistance of transistor 14 and the capacity of the capacitor 16, the switching transistor circuit 17 becomes conductive and causes the trigger section containing capacitor 18 and trigger transformer 19 to act. As a result, the bypass discharge means formed by the discharge tube 20 is caused to discharge so that the remaining energy of the primary capacitor 2 is instantaneously consumed and light emission from the flash means 101 is terminated.

With the above-described features of the invention, the light-receiving element or unit 109, the integrating circuit 111, and the memory circuit 113 may be constructed for each camera type in such a way as to make it possible to obtain a proper exposure, and the setting of variable resistor 31 is selected in accordance with the speed of the film or the exposure aperture determined by the diaphragm setting, so as to bring about in this way an exposure which is determined in accordance with film speed and aperture size.

In the timing circuit 116, it is possible to replace the capacitor 16 by a resistor 16a, shown in dot-dash lines in FIG. 2. In this way the voltage across the teriminals of the primary flash capacitor 2 is divided because of the resistor 16a and the transistor 14, and this divided voltage is applied to the switching transistor circuit 17. The internal resistance of the transistor 14 is determined by the memory circuit 113 and through the drop in voltage across the terminals of the primary flash capacitor 2, resulting from the primary flash, the bypass discharge means 20 is triggered in accordance with the amount of this voltage drop. Also, instead of providing a flash means 101 in the form of a common, single source of flash illumination both for preliminary and primary flash illumination, it is possible to provide a pair of separate flash devices, one for the primary flash and the other for the preliminary flash.

Thus, in accordance with the invention the primary flash used for the actual exposure is controlled in accordance with the preliminary flash intensity. Also, an automatic control of the exposure time based on the memorized information signal can be carried out by controlling the action of the shutter control circuit 121 with the information stored in the memory circuit 113, to bring about termination of exposure simply by closing of the shutter at the proper moment. Therefore, not only during synchronized flash operation utilizing for exposure the discharge of a xenon discharge tube or other strobe, but also under conditions utilizing FP, FM, or M class flashbulbs, which are of longer duration, it is possible to provide a correctly determined exposure time for the exposure to the flash illumination so as to achieve a proper exposure in accordance with the memorized signal resulting from the measuring of the preliminary flash intensity.

Therefore, according to the invention, a single preliminary flash has its light received by the internally situated detector 109 and the primary flash duration or the exposure time are controlled in accordance with the information signal temporarily memorized by the memory circuit 113. In this manner it is possible to achieve proper exposures with cameras having interchangeable objectives and with respect to different objects within the range of the maximum amount of light emission or photographing distance and within the maximum permissible function range of the camera.

What is claimed is:

1. In a camera, an objective, flash means for providing flash illumination, preliminary actuating means coacting with said flash means for actuating the latter to provide a preliminary flash illumination, light-directing means situated in the path of light travel subsequent to said objective for directing light which has passed through said objective along a predetermined path, detecting means situated along the latter path for detecting the intensity of the light of said preliminary flash illumination as well as the intensity of any ambient light after the light has passed through said objective to be directed along said path by said light-directing means, primary actuating means coacting with said flash means for actuating the latter to provide a primary flash to be used during actual film exposure, and control means operatively connected with said detecting means and actuated, in accordance with the light intensity detected thereby, for determining the extent of exposure, said detecting means measuring and memorizing the intensity of light from the preliminary flash and from any ambient source, said control means responding to the information memorized by said detecting means for controlling the exposure, the camera also including a shutter which is opened to initiate an exposure and closed to terminate the exposure, said control means coacting with said shutter for closing the latter after an interval determined by the information memorized by said detecting means.

2. The combination of claim 1 and wherein the camera includes a viewfinder, and said light directing means directing light which has passed through the objective through the viewfinder before reaching said detecting means.

3. The combination of claim 2 and wherein the camera is a single lens reflex camera having a prism viewfinder and a tiltable reflector forming part of said light-directing means and directing light which has passed through the objective into said prism viewfinder, the latter being located along said path for directing light from the viewfinder to said detecting means, said tiltable reflector reflecting light of the preliminary flash through the viewfinder and to said detecting means before tilting of the reflector to a position situated beyond the optical axis when film is exposed.

4. The combination of claim 1 and wherein said flash means provides when actuated by said preliminary actuating means light which, except for the amount of light, is of the same characteristics as the light provided by said flash means when the latter is actuated by said primary actuating means.

5. The combination of claim 1 and wherein said control means includes a bypass emission means which is rendered conductive for terminating emission of light by said flash means after an interval determined by the memorized information of said detecting means to which said control means responds.

6. The combination of claim 1 and wherein said flash means consists only of a single light source, said preliminary actuating means including a preliminary voltage source and a preliminary actuator while said primary actuating means includes a primary voltage source and a primary actuator, and change-over means coacting with said sources and actuators for changing the operation over from said preliminary voltage source and actuator to said primary voltage source and actuator.

7. The combination of claim 1 and wherein said control means includes a timing circuit for providing a controlled time interval for determining said exposure, said timing circuit including a current controlling element and a capacitor and the information memorized by said detecting means being converted into a given internal resistance of said current controlling element of said timing circuit.

8. The combination of claim 1 and wherein said control means includes an electrical circuit having a current controlling element the internal resistance of which is determined by the information memorized by said detecting means, said electrical circuit having a voltage dividing portion for the voltage source of the flash means during primary flash illumination, the latter voltage dividing portion containing said current controlling element and a resistor, and said control means determining the extent of exposure in accordance with the dropping of the divided voltage value of said voltage dividing portion of said circuit to a value which will provide a proper exposure with flash illumination.

9. The combination of claim 1 and wherein the camera includes a manually-actuated shutter element for initiating shutter operation, said shutter element being operatively connected with said preliminary actuating means for operating the latter prior to actual opening of the shutter to make an exposure, said shutter element then operating said primary actuating means and providing opening of the camera shutter after the detecting means had detected the light of said preliminary flash.

10. The combination of claim 9 and wherein said control means includes an electrical circuit having a timing capacitor and a short-circuit switch bypassing said capacitor when said switch is closed, said shutter element opening the latter switch simultaneously with the opening of the shutter to make an exposure.

* * * * *